United States Patent [19]

Quinlan

[11] Patent Number: 4,892,003
[45] Date of Patent: Jan. 9, 1990

[54] ASSEMBLY FOR THE SELF-ADJUSTMENT OF A CABLE CASING

[75] Inventor: James T. Quinlan, Massillon, Ohio

[73] Assignee: Flex Technologies, Inc., Midvale, Ohio

[21] Appl. No.: 186,570

[22] Filed: Apr. 27, 1988

[51] Int. Cl.$^4$ ............................................... F16C 1/14
[52] U.S. Cl. ............................. 74/501.5 R; 403/105
[58] Field of Search ............... 74/501.5 R; 188/196 P, 188/2 D, 24.19; 192/111 A; 248/62, 74.1, 74.2, 411; 403/105

[56] References Cited

U.S. PATENT DOCUMENTS

| | | | |
|---|---|---|---|
| 3,662,617 | 5/1972 | Bennett | 74/501.5 R |
| 3,665,784 | 5/1972 | Bennett | 74/501.5 R |
| 4,235,046 | 11/1980 | Hess et al. | 49/352 |
| 4,598,809 | 7/1986 | Glover et al. | 192/111 A |
| 4,610,180 | 9/1986 | Spease | 74/501.5 R |
| 4,658,668 | 4/1987 | Stocker | 74/501.5 R |
| 4,688,445 | 8/1987 | Spease et al. | 74/501.5 R |
| 4,693,137 | 9/1987 | Deligny | 74/501.5 R |
| 4,694,706 | 9/1987 | Lichtenberg et al. | 74/501.5 R |
| 4,742,901 | 5/1988 | Takeuchi et al. | 192/70.25 |
| 4,751,851 | 6/1988 | Deligny et al. | 74/501.5 R |

FOREIGN PATENT DOCUMENTS 3101498 9/1982 Fed. Rep. of Germany ..... 74/501.5 R
1461806 11/1966 France ................................ 403/105

OTHER PUBLICATIONS

Parker Brass Products Division, Otsego, Mich. 49078, Catalog 3501-E, John Guest USA Inc., Marketing Information and Drawing No. S251.
Voelker Controls Company, 3077 Nationwide Parkway, Brunswick, OH 44212-2394 pp. 1, 3 and 5 of the Innovative Fluid Connectors and Valve brochure.

Primary Examiner—Martin P. Schwadron
Assistant Examiner—Allen J. Flanigan
Attorney, Agent, or Firm—Michael Sand Co.

[57] ABSTRACT

An assembly for the self-adjustment of a casing of the type having a cable slideably mounted therein to remove excess slack from the casing. The cable extends between a lever of a vehicle temperature control module and a door movably mounted on a forward bulkhead of the vehicle. A first mounting member is attached adjacent the control module lever and is adapted for mounting a tang ring, a release bushing and a retaining insert therein, and for slideably receiving a movable end of the cable casing. The retaining insert retains the tang ring and the release bushing in the first mounting member. A second mounting member is attached adjacent the bulkhead door and immovably mounts the other end of the casing. The tang ring includes a plurality of tangs which are positioned to permit movement of the movable casing end therethrough in a first direction upon a predetermined amount of force being exerted on the casing for removing slack from the casing upon manual adjustment of the lever in a predetermined direction. The tangs maintain the casing end in an adjusted position and restrain movement thereof in a second direction opposite to the first direction. A plurality of lugs formed on the release bushing pass through the tang ring when the bushing is manually moved in the first direction, and engage and force the tangs out of engagement with the movable casing end to permit movement of the casing end in the second direction if desired.

16 Claims, 2 Drawing Sheets

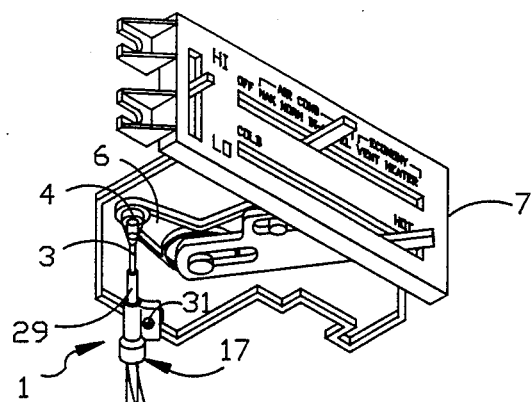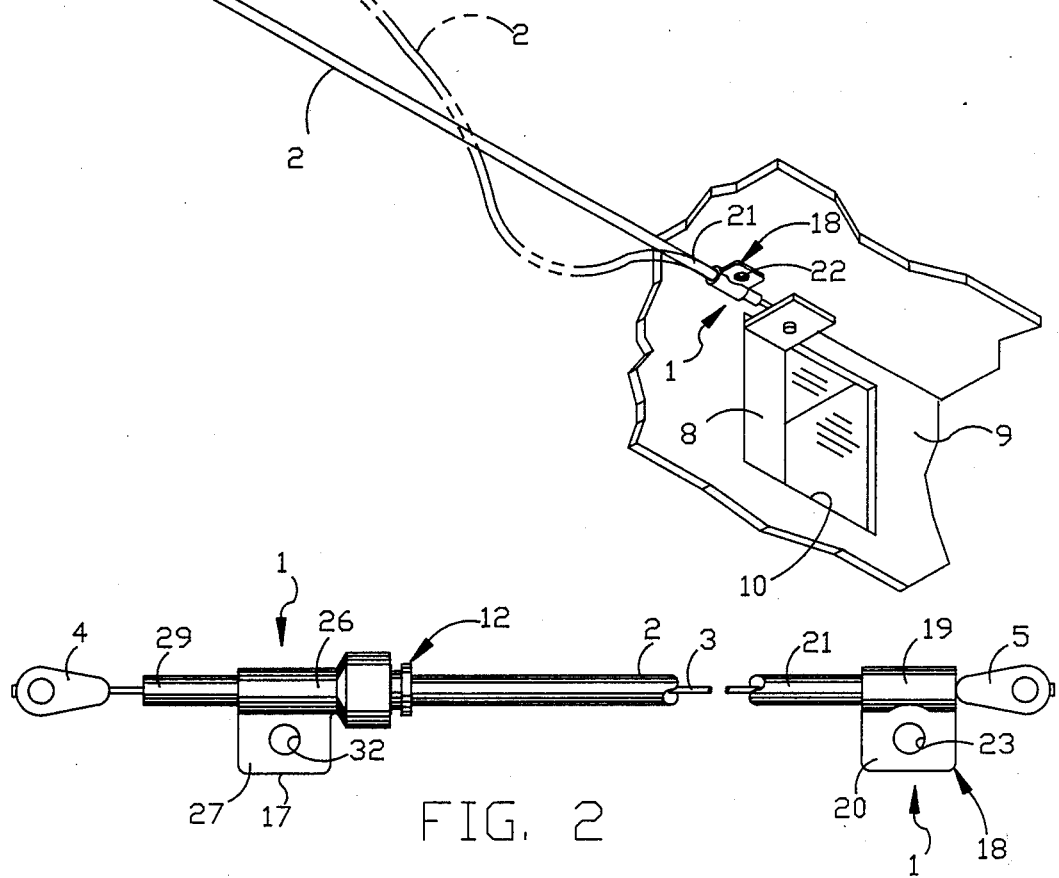
FIG. 1
FIG. 2

ASSEMBLY FOR THE SELF-ADJUSTMENT OF A CABLE CASING

TECHNICAL FIELD

The invention relates to assemblies for eliminating excess slack in cable casings and in particular to an assembly which self-adjusts the casing of a cable which extends between a pair of movable members. More particularly, the invention relates to an assembly for the self-adjustment of the casing of a cable which extends between a temperature control module lever and a bulkhead door in a vehicle.

BACKGROUND ART

All types of vehicles having enclosed passenger compartments, including automobiles, trucks, vans and mini-vans, continue to grow in popularity with the number of these vehicles predicted to increase in the future. Vehicle manufacturers, recognizing this ever-growing market, are continually striving to improve their products. These improvements include on board computers for regulating and monitoring engine performance, improved aerodynamic design for better gas mileage and aesthetic appearance, interior upholstery which rivals that found in the living rooms of many homes, and even computers which calculate and display by LEDs on the dashboard everything from gas mileage to the preferred route for a trip. Despite such advances, manufacturers have been unable to satisfactorily solve the problem of forward firewall or bulkhead doors which improperly open and close upon manual adjustment of control levers for regulating the environment in the passenger compartment.

Most vehicles have a control module mounted in the dashboard for regulating the temperature within the passenger compartment. Other functions such as venting and defrosting of the vehicle windows also are controlled by manual adjustment of the module levers. The levers are connected by cables to the bulkhead doors which are movably mounted for opening and closing apertures formed in the bulkhead.

For example, in many automobiles one of the levers of the control module is moved to the "hot" position for opening a door on the bulkhead and permitting heat to be blown into the passenger compartment during cold weather. As the lever is moved from the "cold" to "hot" position, tension is caused in the cable extending between the lever and door, and the door is pulled to the open position. When the lever is returned to the "cold" position, the tension in the cable is relieved and the door closes.

Problems occur because the cable is slideably mounted in a casing which typically follows a circuitous path between the control module and door. The casing is required for maintaining the integrity of the cable. In most vehicles, the cable casing is mounted at its ends adjacent the door and control module lever, and when the cable is tensioned the casing ends are forced against their mounting members if any excess slack is present in the casing. This excess slack cannot be relieved because the casing ends are immovable. Thus, the cable follows the circuitous path of the casing and because of this excess slack, the cable does not achieve the proper tension required for opening the bulkhead door. Also, possible failure of the mounting members for the casing ends is increased due to the pressure exerted on the casing ends by the compressed casing. A similar problem occurs when an attempt is made to close the door, in that adequate displacement of the cable toward the door is not achieved because the cable again follows the circuitous path of the excessively slackened casing.

Therefore it is apparent that excess slack in the cable casing prevents proper environment control within the vehicle passenger compartment. The operator of the vehicle often is confused because the expected position of the bulkhead door is not achieved when the control module lever is adjusted. Thus, although the lever may be positioned at full "hot", which indicates that the door is completely open, the actual position of the door may indeed only be half open.

The present invention satisfactorily solves the above-described problems and is economical to manufacture and install on a vehicle. More particularly, a worker on an assembly line can install the assembly on a vehicle and adjust the casing to remove the excess slack therefrom in a short amount of time and without delaying the assembly line timetable.

The phenomenon of excess slack in a casing for a cable extending between two movable members occurs in applications other than the one described above. For example, the same problems are common in the cable casing which extends between the control lever and the throttle of a lawn mower engine.

Attempts to solve such problems are well-known in the art and include such prior art devices as a turnbuckle connected to the cable casing, the mounting of a spring clip on the door end of the cable which is operatively connected to the control lever, and the use of a Bowden wire. However, many of these prior art devices require time-consuming installation and manual adjustment.

Known prior art assemblies include quick-connect fittings of the type used with pneumatic and hydraulic pressure system tubing and the like, and instant push-in tube fittings of the type which comprise a main lightweight body, an O-ring fluid seal and a plastic collet having stainless steel teeth.

There is no assembly for the self-adjustment of a cable casing of which I am aware other than my present invention, which is quickly and easily installed and adjusted on a vehicle on a production line at a vehicle manufacturing plant, which will provide for the continuous removal of excess slack in a cable casing even after the vehicle leaves the factory and during certain routine operations of the movable members to which the cable is attached, and which is rugged and relatively inexpensive to manufacture and install.

DISCLOSURE OF THE INVENTION

Objectives of the invention include providing an assembly for the self-adjustment of a casing of the type having a cable slideably mounted therein to remove excess slack from the casing, wherein the cable extends between first and second movable members, and in which the second member is movable by the first member through the cable.

Another objective of the invention is to provide such an assembly for the self-adjustment of a cable casing which provides for gradual rather than discrete amounts of slack elimination in the cable casing, and which provides for self-adjustment of the casing during certain routine operations of the members to which the cable is attached in addition to its initial adjustment at the time of installation.

Still another objective of the invention is to provide an assembly for the self-adjustment of a cable casing in which the force required for adjustment of the casing is considerably less than the gripping force applied to the casing for retaining the casing in the adjusted position and for preventing movement thereof in a direction opposite to that of the adjustment direction.

A still further objective of the invention is to provide an assembly for the self-adjustment of a cable casing in which the assembly is quickly and easily manually released from the casing for readjustment or removal of the casing.

Another objective of the invention is to provide an assembly for the self-adjustment of a cable casing which is inexpensive to manufacture, rugged, and relatively easy to assemble and install.

These objectives and advantages are achieved by the assembly for the self-adjustment of a casing of the type having a cable slideably mounted therein, wherein the cable extends between a manually operated lever of a vehicle temperature control module and a door movably mounted on a forward bulkhead of the vehicle, the assembly includes first and second mounting means for attaching the casing at spaced locations generally adjacent the control module lever and door, respectively; tang means mounted in the first mounting means for encircling and gripping the casing, said tang means permitting passage of the casing therethrough in a single direction; release means mounted in the first mounting means and engagable with the tang means for manually releasing the tang means from the casing; and retainer means mounted in the first mounting means for retaining the tang means and release means in the first mounting means adjacent a movable end of the casing, so that upon manual adjustment of the lever in a first direction the movable casing end moves through the tang means in the single direction to remove slack from the casing and to retain the casing in an adjusted position by the tang means.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a fragmentary diagrammatic perspective view of a usual vehicle temperature control module and an associated bulkhead door operatively connected by a cable, with a slackened cable casing position being shown in dot-dash lines and an adjusted casing position being shown in full lines;

FIG. 2 is a fragmentary diagrammatic view of the cable casing ends and the end mounting members of FIG. 1 having the self-adjustment assembly of the invention incorporated therein;

Similar numerals refer to similar parts throughout the drawings.

BEST MODE FOR CARRYING OUT THE INVENTION

Figure 3:
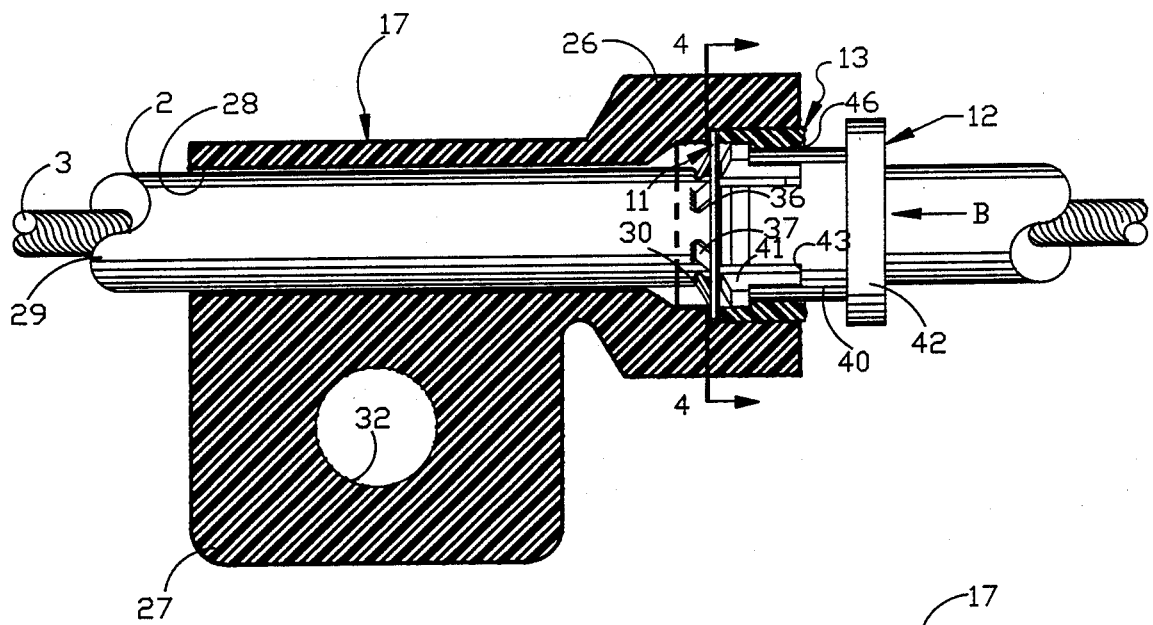
FIG. 3 is a fragmentary longitudinal sectional view of the module mounting member and the self-adjustment assembly of the invention mounted therein.

The assembly of the invention for the self-adjustment of a cable casing is indicated generally at 1, and is shown in FIG. 1 in a usual operating position. Casing 2 is cylindrical-shaped and has a cable 3 slideably mounted therein (FIG. 2) which extends between and is attached by its ends 4 and 5, respectively, in a usual manner to a manually operated lever 6 of a vehicle temperature control module 7 and a door 8 which is movably mounted on a forward bulkhead 9 of a vehicle, such as an automobile, truck, etc. Door 8 is slidably mounted adjacent an opening 10 formed in the bulkhead for opening and closing the opening upon manual adjustment of the lever to regulate the temperature within the passenger compartment of the vehicle.

The main components of assembly 1 includes a tang ring 11, a release bushing 12, a retaining insert 13, a module mounting member 17, and a bulkhead mounting member 18 (FIGS. 1-3). Bulkhead mounting member 18 includes a cylindrical-shaped body 19 having a rectangular tab 20 formed integrally therewith. Member 18 preferably is formed of a high strength plastic. Member 18 is molded about a first end 21 of cable casing 2, and is attached to bulkhead 9 adjacent door 8 by a usual fastener 22 which passes through an opening 23 formed in the tab and into the bulkhead to immovably mount first casing end 21 thereon.

Module mounting member 17 (FIG. 3) includes a generally cylindrical-shaped body 26 having a rectangular tab 27 formed integrally therewith. Member 17 preferably is formed of a high strength plastic as is member 18. Body 26 defines a generally cylindrical-shaped passageway 28 adapted for slidably receiving a second end 29 of casing 2. Passageway 28 has a generally stepped configuration at an outer end thereof to form a shoulder 30 for positioning tang ring 11, release bushing 12 and retaining insert 13 therein. Member 17 is attached to control module 7 adjacent lever 6, by a usual fastener 31 which passes through an opening 32 formed in the tab.

Tang ring 11 (FIGS. 9 and 10) preferably is an integral one-piece metal member formed by a generally flat ring 36 and having a plurality of circumferentially spaced, generally radially inwardly extending tangs 37. Tangs 37 are inclined in a somewhat axial direction as shown in FIG. 10.

Figures 9, 10:
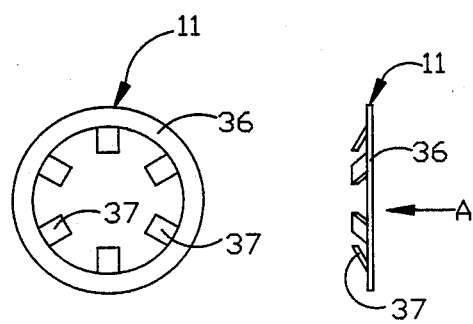
FIG. 9 is an end view of the tang ring component of the improved self-adjustment assembly.
FIG. 10 is a side view of the tang ring of FIG. 9.

In accordance with one of the features of the present invention, tangs 37 permit passage of second casing end 29 through ring 36 in a first direction indicated by arrow A in FIG. 10, which is the axially extending direction of the tangs. When casing end 29 passes through ring 36, tangs 37 encircle and grip the casing to restrict movement of the casing back through the ring, as will be described in greater detail below in the discussion of the operation of assembly 1 and as shown in FIG. 3.

Tang ring 11 preferably is formed of copper or spring steel or other similar material so that the tangs are resilient enough to allow passage of the casing end through ring 36 in the direction of Arrow A when a sufficiently large force is applied on the casing, yet rigid enough to resist a significantly greater force in the opposite direction to restrict movement f the casing back through the ring. More particularly, tangs 37 preferably are designed to withstand a cable return force of approximately ten times the force required to pass the casing end through ring 36 in the installation direction of arrow A, in FIG. 10.

Figures 5, 6:
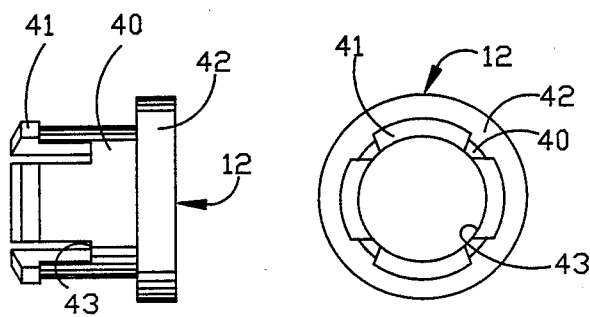
FIG. 5 is a side elevational view of the release bushing component of the improved self-adjustment assembly.
FIG. 6 is a left-hand end view of the release bushing of FIG. 5.

Release bushing 12 (FIGS. 5 and 6) is an integral one-piece member comprising a generally cylindrical-shaped body 40 having a plurality of circumferentially spaced, radially extending lugs 41 formed at one end thereof, and an annular flange or collar 42 formed at the other end. Bushing 12 preferably is formed of acetal or a similar high strength plastic material. Body 40 defines a cylindrical passageway 43 adapted to slidably receive second casing end 29. Lugs 41 engage tangs 37 when manual axial pressure is applied to flange 42 to move bushing 12 in the direction of arrow B in FIG. 3, for releasing the tangs from casing 2 as described below.

Figures 7, 8:
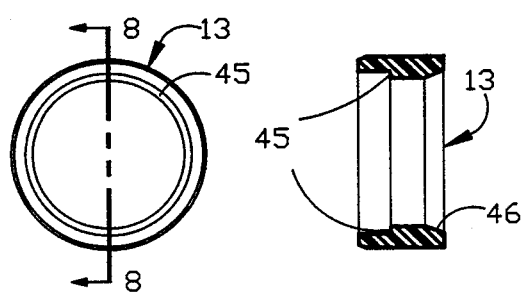
FIG. 7 is an end view of the retaining insert component of the improved self-adjustment assembly.
FIG. 8 is a sectional view taken on line 8—8, FIG. 7.

Retaining insert 13 (FIGS. 7 and 8) is a generally annular-shaped member preferably formed of metal, such as copper or aluminum, or if desired can be formed of a high strength plastic material. Insert 13 mounts and retains tang ring 11 and release bushing 12 in module mounting member 17 as shown in FIG. 3. Retaining insert 13 includes an interior surface having a stepped configuration which forms a shoulder 45 at one end, and a chamfered edge 46 at the opposite end.

The assembly of the present invention is installed and operates in the following manner. Assembly 1 preferably is installed in a car, truck, etc. at the vehicle manufacturing plant. A worker mounts retaining insert 13 on release bushing 12 (FIG. 3) by engaging chamfered edge 46 with lugs 41 and manually forces the insert beyond the lugs by the cam-like action of the chamfered edge against the lugs. Once beyond the lugs, the insert frictionally engages body 40 of the bushing, and the engagement of insert shoulder 45 with lugs 41 prevents accidental disengagement of the insert from the bushing.

Tang ring 11 then is mounted in passageway 28 of module mounting member 17 by pressing ring 36 against shoulder 30 (FIG. 3). The axially extending tangs extend partially into the passageway and toward the temperature control module. The release bushing and retaining insert then are frictionally mounted in passageway 28 by engagement of the exterior surface of the insert with the cylindrical wall of the passageway. The insert abuts ring 36 and forces it against shoulder 30 of the passageway thereby securely mounting the tang ring within the module mounting member. Accidental disengagement of the release bushing from the module mounting member is prevented by engagement of the lugs of the bushing with shoulder 45 of the retaining insert.

In accordance with one of the main features of the invention, an assembly line worker passes cable 3 through passageway 28 of the module mounting member and attaches cable end 4 to control lever 6, and cable end 5 is attached to door 8. Second casing end 29 then is slideably mounted in passageway 43 of release bushing 12 and aligns with the tang ring. Lever 6 then is manually moved from the "cold" to the "hot" position (FIG. 1) placing the cable in tension with a sufficiently large force to enable the casing to move through the tangs in the direction of arrow A (FIG. 10). Any excess slack that is present in the casing, as illustrated by dot-dash lines in FIG. 1, is removed by movement of the slideably mounted casing end through the tang ring and towards the control module, as shown in full lines in FIG. 1. The cable casing is retained in the adjusted position by the gripping action of the tangs which bite into the casing as shown in FIG. 3. Thus, the elimination of excess slack from the casing enables the cable to sufficiently move within the casing for moving the bulkhead door between open and closed positions.

The present invention is quickly and easily installed on a vehicle by a worker as the vehicle is moving down the assembly line, and once installed enables the worker to quickly, easily and accurately eliminate the proper amount of excess slack from the casing merely by moving the control module lever from the "cold" to the "hot" position with the required amount of force.

The above-described factory preadjustment of the cable casing is adequate for proper operation of the control module lever, cable and door. However, if excess slack develops in the casing at a later time, manual adjustment of the control lever between the "cold" and "hot" positions by the operator of the vehicle which applies the required amount of force, enables the assembly to self-adjust the position of the movable casing end in a manner similar to the initial factory preadjustment. However, normal routine movement of the control lever between the various intermediate positions of the control module will not exert enough force on the casing to move it through the tangs. Thus, the self-adjustment feature of the assembly assures proper operation of the temperature control module lever and associated cable and door without the need for costly and time-consuming repairs in the event that excess slack develops in the casing after the vehicle leaves the factory.

Figure 4:
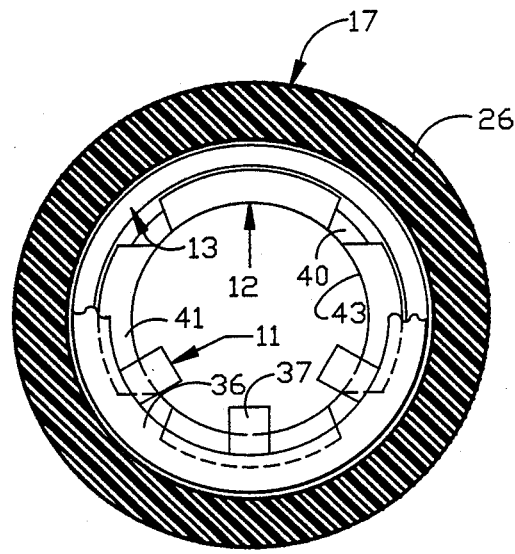
FIG. 4 is an enlarged sectional view taken on line 4—4, FIG. 3, with the cable and casing removed.

If readjustment of the casing end back through the tang ring becomes necessary, or if the casing must be removed from the ring for any reason, the tangs are disengageable from the casing in the following manner. Annular flange 42 is manually grasped and the release bushing is pushed into the module mounting member in the direction of arrow B of FIG. 3. Lugs 41 of the bushing are aligned with the tangs as shown in FIG. 4, so that upon engagement of the lugs with the tangs, the tangs are pushed outwardly and are disengaged from the casing, enabling the casing to be removed from the module mountain member.

It is understood that the concept of the present invention is not effected by the removal of the release bushing from the assembly, which is not required for the self-adjustment of the cable casing and is only provided as a matter of convenience for releasing the assembly from the casing, and as a stop for preventing movement of the tangs back through the ring in a direction opposite from the direction of arrow B in FIG. 3 which could cause the tangs to break off of the ring. It is further understood that the assembly can be used in other applications where the self-adjustment of a cable is required.

In summary, the improved assembly for the self-adjustment of a cable casing provides for removing excess slack in the casing which prevents proper opening and closing of the bulkhead door and corresponding loss of ability to properly regulate the temperature within the passenger compartment of the vehicle. Furthermore, the assembly of the present invention retains the casing in the properly adjusted position and permits self-adjustment of the casing during certain operations of the temperature control module lever by the operator of the vehicle. Most importantly, the assembly is quickly and easily installed and preadjusted at the factory, and enables the casing to be quickly and easily released from the assembly for readjustment or removal, and is relatively inexpensive to manufacture and install, and requires little or no maintainence or repair.

Accordingly, the assembly of the invention for the self-adjustment of a cable casing is simplified, provides an effective, safe, inexpensive, and efficient assembly which achieves all the enumerated objectives, provides for eliminating difficulties encountered with prior assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the assembly for the self-adjustment of a cable casing is constructed and used, the characteristics of the construction, and the advantageous, new and useful results obtained; the new and useful structures, devices, elements, arrangements, parts, and combinations, are set forth in the appended claims.

What is claimed is:

1. An assembly for the self-adjustment of a casing of the type having a cable slideably mounted therein, wherein said cable extends between a manually operated lever of a vehicle temperature control module and a door movably mounted on a forward bulkhead of said vehicle, said assembly including:
   (a) first and second mounting means for attaching the casing at spaced locations generally adjacent the control module lever and door, respectively;
   (b) tang means mounted in the first mounting means for encircling and gripping the casing, said tang means being a generally flat ring having a plurality of circumferentially spaced, generally radially inwardly extending tangs permitting passage of said casing therethrough in a single direction;
   (c) release means mounted in the first mounting means and engageable with the tang means for manually releasing said tang means from the casing; and
   (d) retainer means mounted in the first mounting means for retaining the tang means and release means in said first mounting means adjacent a movable end of the casing, so that upon manual adjustment of the lever in a first direction said movable casing end moves through the tang means in the single direction to remove slack from the casing and to retain the casing is an adjusted position by the tang means.

2. An assembly for the self-adjustment of a casing of the type having a cable slideably mounted therein, wherein said cable extends between a manually operated lever of a vehicle temperature control module and a door movably mounted on a forward bulkhead of said vehicle, said assembly including:
   (a) first and second mounting means for attaching the casing at spaced locations generally adjacent the control module lever and door, respectively;
   (b) tang means mounted in the first mounting means for encircling and gripping the casing, said tang means being a generally flat ring having a plurality of circumferentially spaced, generally radially inwardly extending tangs permitting passage of said casing therethrough in a single direction, each of said tangs being inclined generally in the single direction and encircle and grip the casing to retard movement of the movable casing end in a second direction opposite to said single direction;
   (c) release means mounted in the first mounting means and engageable with the tang means for manually releasing said tang means from the casing; and
   (d) retainer means mounted in the first mounting means for retaining the tang means and release means in said first mounting means adjacent a movable end of the casing, so that upon manual adjustment of the lever in a first direction said movable casing end moves through the tang means in the single direction to remove slack from the casing and to retain the casing in an adjusted position by the tang means.

3. The assembly defined in claim 2 in which the first mounting means is a generally cylindrical-shaped member which defines a passageway adapted for mounting the tang means, release means and retainer means therein, and for slideably receiving the movable end of the cable casing; and in which the second mounting means is a generally cylindrical-shaped member adapted for immovably mounting a second end of the casing.

4. An assembly for the self-adjustment of a casing of the type having a cable slidably mounted therein, wherein said cable extends between a manually operated lever of a vehicle temperature control module and a door movably mounted on a forward bulkhead of said vehicle, said assembly including:
   (a) first and second mounting means for attaching the casing at spaced locations generally adjacent the control module lever and door, respectively;
   (b) tang means mounted in the first mounting means for encircling and gripping the casing, said tang means being a generally flat ring having a plurality of circumferentially spaced, generally radially inwardly extending tangs permitting passage of said casing therethrough in a single direction;
   (c) release means mounted in the first mounting means and engageable with the tang means for manually releasing said tang means from the casing; and
   (d) retainer means comprising an annular insert frictionally mounted in the first mounting means for retaining the tang means and release means in said first mounting means adjacent a movable end of the casing, so that upon manual adjustment of the lever in a first direction said movable casing end moves through the tang means in the single direction to remove slack from the casing and to retain the casing in an adjusted position by the tang means.

5. The assembly defined in Claim 4 in which each of the tangs is inclined generally in the single direction., and in which said tangs encircle and grip the casing to retard movement of said movable casing end in a second direction opposite to said single direction.

6. The assembly defined in Claim 5 in which the release means is a generally cylindrical-shaped bushing having a passageway formed therethrough; in which the movable casing end extends through the passageway of the release means bushing; in which a plurality of circumferentially spaced, radially extending lugs are formed on said bushing; in which the release bushing is mounted adjacent the tang means ring in the first mounting means; and in which the lugs pass through the ring when the release bushing is manually moved in the single direction to engage and force the tangs out of engagement with the movable casing end to permit movement of said casing end in the second direction.

7. The assembly defined in claim 2 in which the retainer means is an annular insert; and in which said annular insert is frictionally mounted in the first mounting means.

8. An assembly for the self-adjustment of a casing of the type having a cable slideably mounted therein, wherein said cable extends between first and second movable members with the second member being movable by the first member through said cable, said assembly including:
   (a) mounting means for attaching the casing at spaced locations generally adjacent the first and second movable members;
   (b) tang means mounted in the mounting means for gripping the casing, said tang means including a ring having a plurality of circumferentially spaced, radially inwardly extending tangs generally inclined in a first direction permitting movement of said casing therethrough in said first direction and restraining the movement of said casing in a second direction opposite to said first direction; and
   (c) retainer means mounted in the mounting means for retaining the tang means in said mounting means adjacent a movable end of the casing, so that upon movement of the first member in a predetermined direction said movable casing end moves through the tang means in the first direction to remove slack from the casing and to retain the casing in an adjusted position by the tang means.

9. The assembly defined in claim 8 in which the first movable member is a manually operated lever of a vehicle temperature control module; and in which the second movable member is a door mounted on a forward bulkhead of said vehicle.

10. The assembly defined in claim 8 in which release means is mounted in the mounting means and is engagable with the tang means for manually releasing said tang means from the casing.

11. The assembly defined in Claim 10 in which the mounting means includes first and second mounting members; in which the first mounting member is generally cylindrical-shaped and defines a passageway adapted for mounting the tang means, release means and retainer means therein, and for slideably receiving the moveable end of the cable casing; and in which the second mounting member is generally cylindrical-shaped and immovably mounts a second end of the casing.

12. The assembly defined in Claim 11 in which the release means is a generally cylindrical-shaped bushing having a passageway formed therein through which the movable casing end passes; in which a plurality of circumferentially spaced, radially extending lugs are formed on said bushing;, in which the release bushing is mounted adjacent the tang means ring in the first mounting member; and in which the lugs pass through the ring when the release bushing is manually moved in the first direction, and engage and force the tangs out of engagement with the movable casing end and toward said first direction to permit movement of said casing end in the second direction.

13. The assembly defined in claim 11 in which the retainer means is an annular insert; in which the annular insert retains the tang means and release means in the first mounting member; and in which said annular insert is frictionally mounted in the first mounting member.

14. An assembly for the self-adjustment of a casing of the type having a cable slideably mounted therein, wherein said cable extends between a pair of movable members, said assembly including:
   (a) a pair of mounting means for attaching the casing at spaced locations generally adjacent the movable members; and
   (b) tang means comprising a plurality of circumferentially spaced tangs radially inclined in a first direction mounted in one of the mounting means adjacent a movable end of the casing and permitting movement of said casing end therethrough in said first direction so that upon movement of said one movable member in said first direction said movable casing end moves through the tang means to remove slack from the casing and is retained in an adjusted position by the tangs which prevent movement of the casing in a direction opposite to said first direction.

15. An assembly for the self-adjustment of a casing of the type having a cable slideably mounted therein, wherein said cable extends between a manually operated lever of a vehicle temperature control module and a door movably mounted on a forward bulkhead of said vehicle, said assembly including:
   (a) first and second mounting means for attaching the casing at spaced locations generally adjacent the control module lever and door, respectively;
   (b) tang means mounted in the first mounting means for encircling and gripping the casing, said tang means permitting passage of said casing therethrough in a single direction;
   (c) release means mounted in the first mounting means and engageable with the tang means for manually releasing said tang means from the casing; and
   (d) retainer means including an annular insert frictionally mounted in the first mounting means for retaining the tang means and release means in said first mounting means adjacent a movable end of the casing, so that upon manual adjustment of the lever in a first direction said movable casing end moves through the tang means in the single direction to remove slack from the casing and to retain the casing in an adjusted position by the tang means.

16. An assembly for the self-adjustment of a casing of the type having a cable slideably mounted therein, wherein said cable extends between first and second movable members with the second member being movable by the first member through said cable, said assembly including:
   (a) first and second mounting members for attaching the casing at spaced locations generally adjacent the first and second movable members, respectively; said first mounting member being generally cylindrical-shaped and having a passageway formed therein with the second mounting member being generally cylindrical-shaped and immovably mounting a second end of the casing;

(b) a generally flat ring having a plurality of circumferentially spaced, inwardly extending tangs inclined in a first direction mounted in the passageway of the first mounting member for slideably receiving the moveable end of the cable casing;

(c) retainer means mounted in the mounting means for retaining the tang means in said mounting means adjacent movable end of the casing, so that upon movement of the first member in a predetermined direction said movable casing end moves through the tang means in the first direction to remove slack from the casing and to retain the casing in an adjusted position by the tang means; and (d) release means comprising a generally cylindrical-shaped bushing having a passageway formed therein through which the movable casing end passes; said bushing being mounted adjacent the tang means ring in the first mounting member and having a plurality of circumferentially spaced, radially extending lugs formed on said bushing; wherein the lugs pass through the ring when the release bushing is manually moved in the first direction, and engage and force the tangs out of engagement with the movable casing end.

* * * * *